(12) United States Patent
Peddi et al.

(10) Patent No.: US 11,742,785 B2
(45) Date of Patent: Aug. 29, 2023

(54) METHOD AND APPARATUS FOR OPERATING AN ELECTRIC DRIVE UNIT

(71) Applicant: GM GLOBAL TECHNOLOGY OPERATIONS LLC, Detroit, MI (US)

(72) Inventors: Vinod Chowdary Peddi, Shelby Township, MI (US); Brian A. Welchko, Oakland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/512,074

(22) Filed: Oct. 27, 2021

(65) Prior Publication Data

US 2023/0131967 A1    Apr. 27, 2023

(51) Int. Cl.
*H02P 27/08* (2006.01)
*H02M 7/5387* (2007.01)

(52) U.S. Cl.
CPC ........ *H02P 27/08* (2013.01); *H02M 7/53875* (2013.01)

(58) Field of Classification Search
CPC .. H02P 21/22; H02P 21/13; H02P 6/08; H02P 27/04; H02P 6/34; H02P 21/06; H02P 21/141; H02P 21/0003; H02P 21/0025; H02P 27/085; B60L 15/2045; B60L 15/025; B60L 2240/421; B60L 2240/425; B60L 2240/429; B60L 2240/423; B60L 2210/40; B60L 2240/427
See application file for complete search history.

(56) References Cited

U.S. PATENT DOCUMENTS

| | | | |
|---|---|---|---|
| 10,149,413 B1* | 12/2018 | Dede | H05K 7/20927 |
| 2016/0114801 A1* | 4/2016 | Park | H02P 21/141 |
| | | | 701/99 |

* cited by examiner

*Primary Examiner* — Said Bouziane
(74) *Attorney, Agent, or Firm* — CANTOR COLBURN LLP

(57) ABSTRACT

An electric drive unit includes a polyphase alternating current (AC) motor, an inverter. A motor controller employs field oriented controls to achieve torque and heat production objectives for the electric drive unit. Additional heat may be generated through inverter operation control.

14 Claims, 7 Drawing Sheets

METHOD AND APPARATUS FOR OPERATING AN ELECTRIC DRIVE UNIT

INTRODUCTION

Electric vehicles (EV) and hybrid electric vehicles (HEV) (i.e. electrified vehicles) may include an electric drive system and one or more rechargeable energy storage systems (RESS), for example batteries and capacitors. The RESS may advantageously employ a thermal management system including removal and addition of heat. Likewise, the electric drive system may advantageously employ a thermal management system including removal of heat.

Electrified vehicles may employ heat sources, for example to provide cabin heat or for raising the temperature of the RESS to more optimal temperatures for charging, discharging and extending RESS life. Heat sources often add components and system complexity to the electrified vehicle.

The subject disclosure relates to generation and utilization of heat from the electric drive system for use within the electrified vehicle.

SUMMARY

In one exemplary embodiment, a method for operating an electric drive unit including an inverter operatively coupled to a polyphase alternating current (AC) motor and a field oriented controller operating in a dq reference frame operatively coupled to the inverter may include receiving a torque command corresponding to a torque to be produced by the AC motor and receiving a heat level request corresponding to a heat to be generated within the electric drive unit. Based upon the heat level request, one of a plurality of predetermined candidate current trajectories that are capable of producing the torque in the AC motor is selected, and the field oriented controller commanded in accordance with the selected one of the plurality of predetermined candidate current trajectories.

In addition to one or more of the features described herein, selecting the one of the plurality of predetermined candidate current trajectories may include determining a desired current based upon the heat level request and selecting the one of the plurality of predetermined candidate current trajectories based upon the desired current.

In addition to one or more of the features described herein, the plurality of predetermined candidate current trajectories may be determined based upon the torque command.

In addition to one or more of the features described herein, the plurality of predetermined candidate current trajectories may be determined by referencing pairs of current magnitudes and phase angles defining current vectors, and resolving the current vectors into respective direct-axis current components and quadrature-axis current components.

In addition to one or more of the features described herein, the predetermined current trajectories may include a linear trajectory within a region of the dq reference frame bounded by a maximum torque per ampere trajectory, a current limit circle, a maximum torque per volt trajectory and a direct-axis of the dq reference frame.

In addition to one or more of the features described herein, the predetermined current trajectories may include an arc of a current circle within a region of the dq reference frame bounded by a maximum torque per ampere trajectory, a current limit circle, a maximum torque per volt trajectory and a direct-axis of the dq reference frame.

In addition to one or more of the features described herein, the predetermined current trajectories may include a linear portion and an arc of a current circle within a region of the dq reference frame bounded by a maximum torque per ampere trajectory, a current limit circle, a maximum torque per volt trajectory and a direct-axis of the dq reference frame.

In addition to one or more of the features described herein, the arc of the current circle may extend between the linear portion and the maximum torque per ampere trajectory.

In another exemplary embodiment, an apparatus for generating heat in a vehicle may include an electric drive unit having a polyphase alternating current (AC) motor, an inverter operatively coupled to the AC motor, and a motor controller operatively coupled to the inverter. The motor controller may be configured to control the inverter in accordance with an implemented current trajectory using a field oriented control scheme operating in a dq reference frame, receive a torque command corresponding to a desired torque to be produced by the AC motor, receive a heat level request corresponding to a heat to be generated within the electric drive unit, receive a mode control signal, and based upon the heat level request and the mode control signal, select one of a plurality of predetermined candidate current trajectories that are capable of producing the desired torque in the AC motor as the implemented current trajectory, wherein the candidate current trajectories may be within a region of the dq reference frame bounded by a maximum torque per ampere trajectory, a current limit circle, a maximum torque per volt trajectory and a direct-axis of the dq reference frame.

In addition to one or more of the features described herein, the apparatus for generating heat in a vehicle may further include selectively variable gate resistance operatively coupled between the motor controller and power switches of the inverter, and the motor controller may be further configured to increase the gate resistance effective to generate additional heat at power switching devices within the inverter.

In addition to one or more of the features described herein, the motor controller may be further configured to control the inverter in a continuous pulse width modulation effective to generate additional heat at power switching devices within the inverter.

In addition to one or more of the features described herein, the motor controller may be further configured to control the inverter by increasing a switching frequency effective to generate additional heat at power switching devices within the inverter.

In addition to one or more of the features described herein, the predetermined current trajectories may include a linear portion and an arc of a current circle within the region of the dq reference frame bounded by the maximum torque per ampere trajectory, the current limit circle, the maximum torque per volt trajectory and the direct-axis of the dq reference frame.

In addition to one or more of the features described herein, the arc of the current circle may extend between the linear portion and the maximum torque per ampere trajectory.

In addition to one or more of the features described herein, the mode control signal may include current limits based upon temperatures of electric drive unit components.

In addition to one or more of the features described herein, the mode control signal may include current limits based upon a current-time profile.

In yet another exemplary embodiment, a method for operating an electric drive unit including an inverter operatively coupled to a polyphase alternating current (AC) motor and a field oriented controller operating in a dq reference frame operatively coupled to the inverter may include receiving a heat level request corresponding to a heat to be generated within the electric drive unit. In response to the heat level request, the inverter may be controlled to a predetermined heat generating current trajectory using a field oriented control scheme operating in a dq reference frame, the predetermined heat generating current trajectory being within a region of the dq reference frame bounded by a maximum torque per ampere trajectory, a current limit circle, a maximum torque per volt trajectory and a direct-axis of the dq reference frame, and the predetermined heat generating current trajectory intersecting the maximum torque per ampere trajectory at an intersection operating point. Control of the inverter may be transitioned from the predetermined heat generating current trajectory to the maximum torque per ampere trajectory at the intersection operating point.

In addition to one or more of the features described herein, the predetermined heat generating current trajectory may be selected from a plurality of candidate heat generating current trajectories based upon the heat level request.

In addition to one or more of the features described herein, the predetermined heat current trajectory may include a linear portion and an arc of a current circle.

In addition to one or more of the features described herein, the predetermined heat current trajectory avoids a sub-region within the region based upon undesirable operating characteristics associated with the sub-region.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
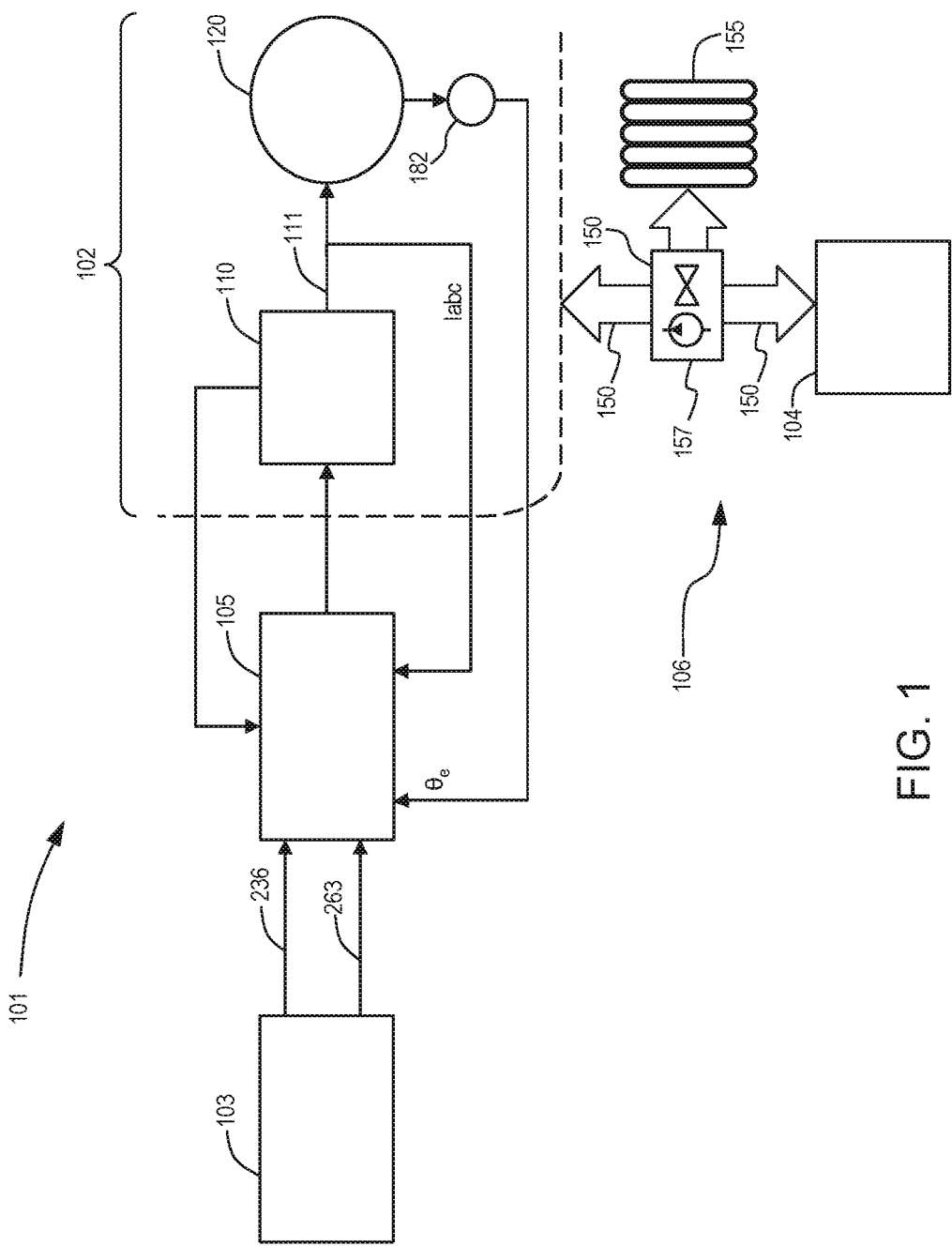
FIG. 1 schematically illustrates an embodiment of an electric drive system in a vehicular application, in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

FIG. 1 schematically illustrates an embodiment of an electric drive system 101 in a vehicular application. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric drive system 101 may include various control components, electrical and electro-mechanical systems including, for example, a rechargeable energy storage system (RESS) 104 and an electric drive unit (EDU) 102. Electric drive system 101 may be employed on powertrain systems to generate propulsion torque as a replacement for or in conjunction with an internal combustion engine in various electric vehicle (EV) applications and hybrid electric vehicle (HEV) applications, respectively. Propulsion torque requests or commands (Tcmd) 236 may be provided by a vehicle controller 103 to a motor controller 105. In accordance with an embodiment, the vehicle controller 103 may also provide a heat level request 263 to the motor controller 105 as further described herein.

The RESS may in one embodiment be a battery or battery pack, for example a high capacity, high voltage (e.g., nominal 400 volt) rechargeable lithium ion battery pack. High capacity battery packs are known to include a plurality of battery pack modules allowing for flexibility in configurations and adaptation to application requirements. For example, in vehicular uses, battery packs may be modular to the extent that the number of battery modules may be varied to accommodate a desired energy density or range objective of a particular vehicle platform, intended use, or cost target. Thus, battery packs may including a plurality of lithium ion modules themselves constructed from respective pluralities of lithium ion cells.

The electric drive unit EDU 102 may be of varying complexity, componentry and integration. An exemplary highly integrated EDU 102 may include, for example, an electric motor, reduction and differential gearing, housings including air and liquid cooling features, electrical bus structures, HV bus structures, power electronics (e.g., inverters), controllers, and other related components. The electric drive system 101 may include an alternating current (AC) electric machine (hereafter AC motor) 120 having a motor output shaft (not illustrated). The motor output shaft may transfer torque between the AC motor 120 and other driveline components (not illustrated), for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components.

AC motor 120 may be a polyphase AC motor such as a three phase AC motor receiving three-phase AC power over a multi-phase motor control power bus (AC bus) 111 which is coupled to inverter module 110. In one embodiment, the AC motor 120 is a three-phase motor and the inverter module 110 is a three-phase inverter. Inverter module 110 may include a plurality of solid-state switches such as IGBTs and power MOSFETs. The inverter module 110 receives DC power over a high voltage (HV) DC bus coupled to RESS 104, for example at 400 volts. Motor controller 105 is coupled to inverter for control thereof. The inverter module 110 electrically connects to the AC motor 120 via the AC bus, with electric current monitored on two or three of the leads thereof. The inverter module 110 is configured with suitable control circuits including paired power transistors, e.g., IGBTs for transforming high-voltage DC electric power to high-voltage AC electric power and transforming high-voltage AC electric power to high-voltage DC electric power. The inverter module 110 may employ pulse width modulation (PWM) control to convert stored DC electric power originating in the RESS 104 to AC electric power to drive the AC motor 120 to generate torque. Similarly, the inverter module 110 converts mechanical power transferred to the AC motor 120 to DC electric power to generate electric energy that is storable in the RESS 104, including as part of a regenerative control strategy. It is appreciated that the inverter module 110 is configured to receive motor control commands from motor controller 105 and control inverter states to provide the motor drive and regeneration functionality.

Control of the inverter module 110 may include high frequency switching of the solid-state switches in accordance with a PWM control. A number of design and application considerations and limitations determine inverter switching frequency and PWM control. Commonly, inverter controls for AC motor applications may include fixed switching frequencies, for example switching frequencies around 10-12 kHz and PWM controls that minimize switching losses of the IGBTs or other power switches of the inverter module 110. However, in accordance with certain embodiments, inverter module 110 switching frequencies and PWM control may provide useful control parameters as further described herein.

The EDU 102 may include various passive and active thermal management features. Similarly, the RESS 104 may include various passive and active thermal management features. Heat generated within the EDU 102 is understood to include heat generated from all sources within the EDU 102 including, by way of non-limiting examples, power electronics components such as IGBTs, current carrying components including AC and DC buses, bars, cables and other current conductors including stator windings, and mechanical sources such as friction. Heat may be removed from the EDU 102 via passive heat sinks including power electronics heat sinks and enclosure features. Similarly, heat generated within the RESS 104 may be removed from the RESS 104 via passive heat sinks and enclosure features. Heat may be transferred from the EDU 102 or RESS 104 via fluid circulation paths 150 containing circulated fluid for example. Transferred heat may be radiated to the ambient environment or vehicle cabin via a radiator or heater core 155. In accordance with one embodiment, heat from the EDU 102 may be selectively transferred to the RESS 104 via a fluid circulation loop 106 including circulation paths 150 and controllable circulation valves and pumps 157 thereby thermally coupling the EDU 102 and RESS 104. For example, a closed fluid circulation loop 106 may transfer heat generated in the EDU 102 to the RESS 104 via fluid circulation paths 150 within the EDU 102 and the RESS 104 including a fluid circulating cooling plate within the RESS 104.

The AC motor 120 may be configured as a high-voltage multi-phase electric motor/generator that converts stored electric energy to mechanical power and converts mechanical power to electric energy that may be stored in RESS 104 as described. In one embodiment, the AC motor 120 is a three-phase (abc) AC machine and the inverter module 110 is a three-phase PWM inverter. The AC motor 120 includes a rotor and a stator (not illustrated) and an accompanying position sensor 182, which is a variable reluctance resolver in one embodiment. The position sensor 182 may signally connect directly to the motor controller 105 and is employed to monitor angular position of the rotor ($\theta_e$) of the AC motor 120. The angular position of the rotor ($\theta_e$) of the AC motor 120 is employed by the motor controller 105 to control operation of the inverter module 110 that controls the AC motor 120. The motor controller 105 may be co-located with the inverter module 110 or, alternatively, may be remotely located apart therefrom.

Control of the AC motor 120 may employ direct (d)-quadrature (q) transformations (abc-dq) to simplify analysis and control of the multi-phase circuits operation of the AC motor 120. This permits reducing three AC quantities to two direct current (DC) quantities for ease of calculations and associated control in the two-dimensional dq reference frame. A stator motor current space vector can be defined in the dq reference frame with orthogonal components along the direct axis (d-axis) and quadrature axis (q-axis) such that a field flux linkage is aligned along the d-axis and a torque component is aligned along the q-axis. After execution of calculations, an inverse transformation (dq-abc) occurs to determine control commands for operating the motor that can be executed in the inverter module 110. Flux commands are used to determine a direct-current (Id) portion of control in the dq reference frame and torque commands correspond to the quadrature-current (Iq) portion of control in the dq reference frame.

Figure 2:
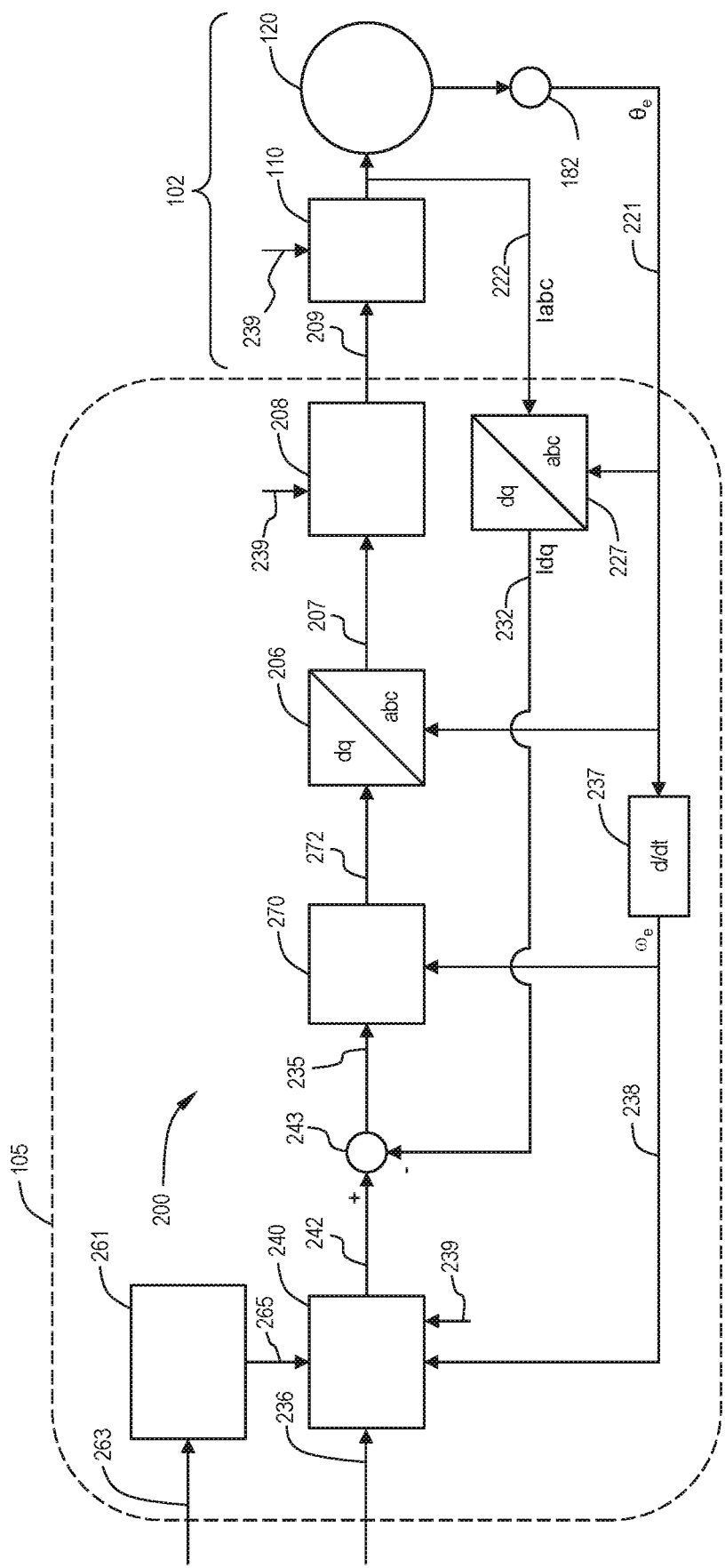
FIG. 2 is a block diagram of a motor controller and electric drive unit employing an exemplary field oriented controller, in accordance with the present disclosure.

FIG. 2 is a block diagram of a motor controller 105 and EDU 102 employing an exemplary field oriented controller (FOC) 200 in accordance with one embodiment. The EDU 102 may include an AC motor 120 and inverter module 110. Using a FOC control scheme, the FOC 200 controls the AC motor 120 via the inverter module 110 coupled to the three phase (abc) windings of the AC motor 120 so that the AC motor 120 can efficiently use a DC input voltage ($V_{dc}$) (i.e. HV DC bus voltage) provided to the inverter module 110 by adjusting current commands to the FOC controller 200.

In the following description of one particular non-limiting implementation, the three-phase AC motor 120 may be a three-phase, permanent magnet AC machine. However, it should be appreciated that the illustrated embodiment is only one non-limiting example of the types of three-phase AC machines that the disclosed embodiments may be applied to. Further, it will also be appreciated that the disclosed embodiments are not limited to a three-phase system, and in other embodiments, the AC motor 120 can have other numbers of phases, and further that the disclosed embodiments may be applied to any type of multi-phase AC machine that includes fewer or more phases. In one particular implementation, the AC motor 120 may be a three-phase, permanent-magnet synchronous motor.

The AC motor 120 is coupled to the inverter module 110 via three inverter poles and generates mechanical power as the product of torque and speed based on three-phase current signals (Iabc) received from the inverter module 110. In the present embodiment, the angular position of a rotor ($\theta_e$) 221 or "shaft position" is measured using the position sensor 182. A derivative function, or a virtual software observer, 237 of the angular position of a rotor ($\theta_e$) 221 with respect to time may be used to generate angular velocity ($\omega_e$) 238 of the AC motor 120.

The FOC 200 includes a command generation module 240, a current regulator module 270, a rotating orthogonal (dq) reference frame to static three-phase (abc) reference frame (dq-to-abc reference frame) transformation module 206, a pulse width modulation (PWM) generation module 208, and a static three-phase (abc) reference frame to rotating orthogonal (dq) reference frame (abc-to-dq reference frame) transformation module 227.

The command generation module 240 receives a torque command signal (Tcmd) 236, angular velocity ($\omega_e$) 238 of the shaft that is generated based on the derivative of the rotor position output ($\theta_e$) 221, and the DC input voltage (Vdc) 239 as inputs, along with other system parameters depending upon implementation. The command generation module 240 uses these inputs to generate d-axis and q-axis current trajectories (synchronous reference frame current trajectory (Idq-cmd)) 242 that will cause the AC motor 120 to generate the commanded torque (Tcmd) at angular velocity ($\omega_e$) 238. Moreover, the synchronous reference frame current trajectories (Idq-cmd) 242 may be effective to generate heat utilized in the system as described further herein. Such heat generation may be controlled in accordance with a mode control signal 265 from mode management module 261 which receives a heat level request 263 as described further herein. Thus, in accordance with one embodiment, the command generation module 240 may use the inputs to map the torque command signal (Tcmd) 236 and mode control signal 265 to the synchronous reference frame current trajectory (Idq-cmd) 242 to effect desired torque and heat objectives, among others.

The abc-to-dq transformation module 227 receives measured three-phase stationary reference frame stator currents (Iabc) 222 that are fed back from the AC motor 120. The abc-to-dq transformation module 227 uses these three-phase stationary reference frame stator currents (Iabc) 222 to perform an abc-to-dq reference frame transformation to transform the three-phase stationary reference frame stator currents (Iabc) 222 into synchronous reference frame feedback current signals (Idq) 232. The process of stationary-to-synchronous conversion is well-known in the art.

The current regulator module 270 receives, from summing node 243, the error (Idq-err) 235 between the synchronous reference frame current trajectories (Idq-cmd) 242 and the synchronous reference frame feedback current signals (Idq) 232 to generate synchronous reference frame voltage command signals (Vdq-cmd) 272. The synchronous reference frame voltage command signals (Vdq-cmd) 272 are DC commands that have a constant value as a function of time for steady state operation. Because the current commands are DC signals in the synchronous reference frame they are easier to regulate in comparison to AC stationary reference frame current commands. The process of current to voltage conversion by current regulator module 270 may be implemented as a proportional-integral (PI) controller, which is known in the art.

The dq-to-abc reference frame transformation module 206 receives the synchronous reference frame voltage command signals (Vdq-cmd) 272, and based on these signals, generates stationary reference frame voltage command signals (Vabc-cmd) 207 (also referred to as "phase voltage signals" or "phase voltage command signals") that are sent to the PWM generation module 208. The dq-to-abc transformation may be performed using any known transformation techniques.

The inverter module 110 is coupled to the PWM generation module 208. The PWM generation module 208 is used for the control of pulse width modulation of the phase voltage command signals (Vabc-cmd) 207. Switching vector signals (Sabc) 209 are generated based on duty cycle waveforms that are internally generated by the PWM generation module 208 to have a particular duty cycle during each PWM period. The PWM generation module 208 modifies the phase voltage command signals (Vabc-cmd) 207 based on the duty cycle waveforms and the DC input voltage (Vdc) 239 to generate the switching vector signals (Sabc) 209, which it provides to the inverter module 110. The particular modulation algorithm implemented in the PWM generation module 208 may be any known modulation algorithm including continuous PWM techniques (e.g., Space Vector Pulse Width Modulation (SVPWM)) or discontinuous PWM techniques (e.g., DPWM) techniques to create AC waveforms that drive the AC motor 120 at varying angular velocities based on the DC input voltage (Vdc) 239. It is generally appreciated that discontinuous PWM has lower switching losses and hence less heat generation than continuous PWM. Moreover, the switching frequency implemented in the PWM generation module 208 may be fixed or variable in accordance with various control objectives and efficiency tradeoffs. For example, it is known that higher switching frequencies result in higher switching losses and greater heat generation in the IGBTs or other power switches of the inverter module 110. While it may be generally desirable to minimize switching losses, higher switching frequencies may be advantageously be employed where heat generation is a desired control objective. Thus, a baseline operation of the PWM generation module 208 may be at a relatively low switching frequency (e.g., 10-12 kHz) with DPWM when overall efficiency is the controlling objective. However, where additional heat generation is a desired objective, higher switching frequencies (e.g., 20 kHz, 25 kHz, 30 kHz) and alternative PWM modulation (e.g., SVPWM) may be employed, individually or in combinations.

The switching vector signals (Sabc) 209 control the switching states of switches in the inverter module 110 to generate the respective phase voltages at each phase winding of the AC motor 120. The switching vector signals (Sabc) 209 are PWM waveforms that have a particular duty cycle during each PWM period that is determined by the duty cycle waveforms that are internally generated at the PWM generation module 208. The AC motor 120 receives the three-phase voltage signals generated by the inverter module 110 and generates a machine output at the commanded torque (Tcmd) 236.

Figure 6:
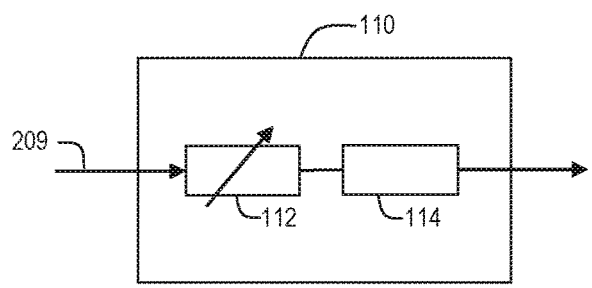
FIG. 6 illustrates a selectively variable gate resistance, in accordance with the present disclosure.

In accordance with one embodiment and with reference to FIG. 6, a gate resistor 112 may be located between the output of the driver—the PWM generation module 208 in the present embodiments—and the input of the power switching devices (IGBTs 114 or other power switches of the inverter module 110). The gate resistor may be incorporated within the inverter module 110 or separate therefrom. Charging and discharging rates of the IGBT 114 gate capacitors affects IGBT 114 on and off switching speeds, and the charging and discharging rate is affected by the gate resistor 112. Generally, with higher gate resistance value, the switching speed of the power device will decrease and result in increased switching loss and increased heat. In one embodiment, the gate resistors 112 may include an adaptive gate drive providing a selectively variable gate resistance, for example a switchable resistor matrix responsive to a PWM signal from the output of the driver corresponding to the desired gate resistance. Alternative control signals from the motor controller 105 may selectively adjust the gate resistance. The inclusion of an adaptive gate drive may beneficially provide another means for increasing the heat production of the EDU 102.

Figure 3A:
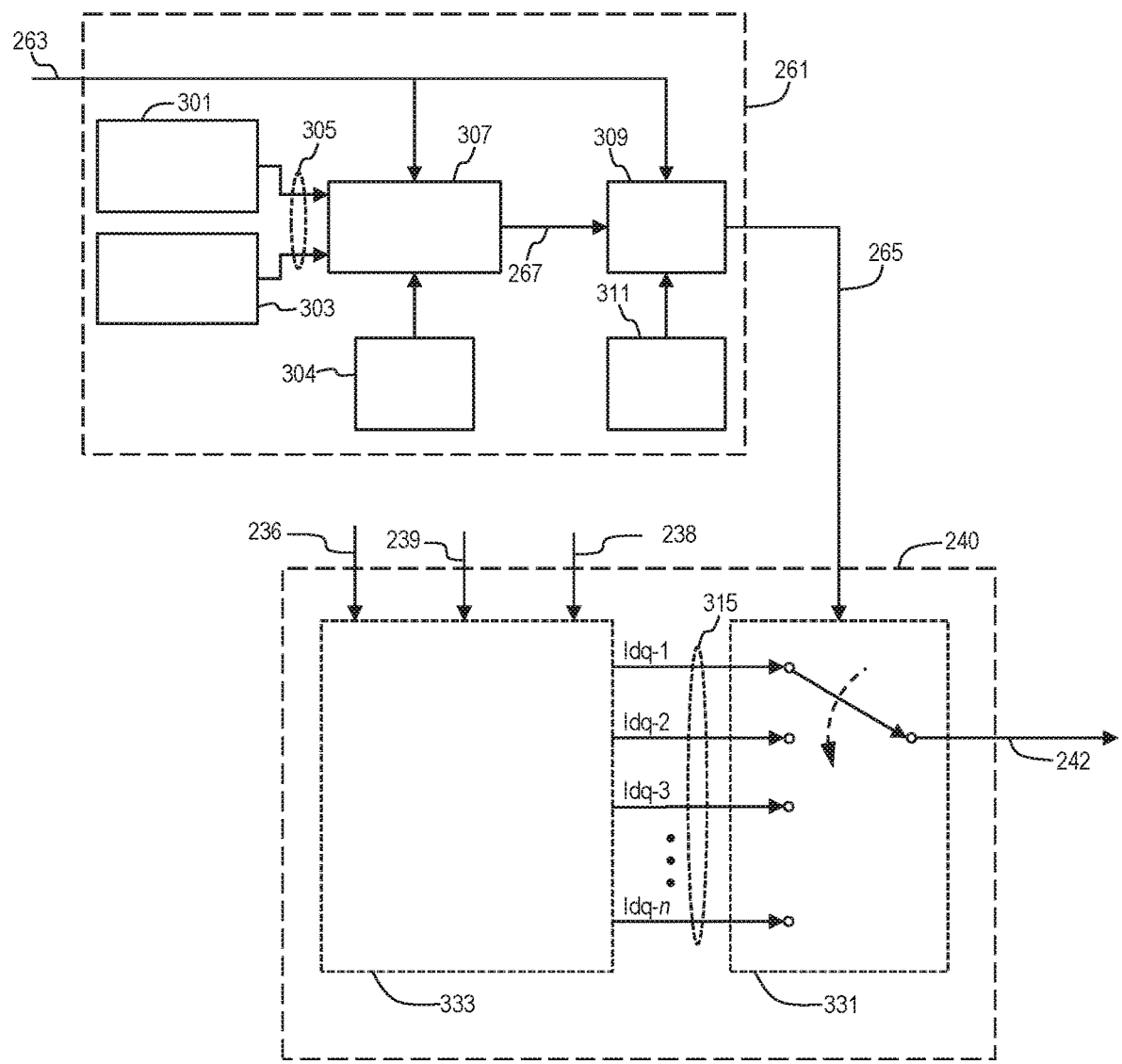
FIGS. 3A, 3B and 3C illustrate exemplary embodiments of the mode management module and command generation module illustrated in FIG. 2, in accordance with the present disclosure.
Figure 3B:
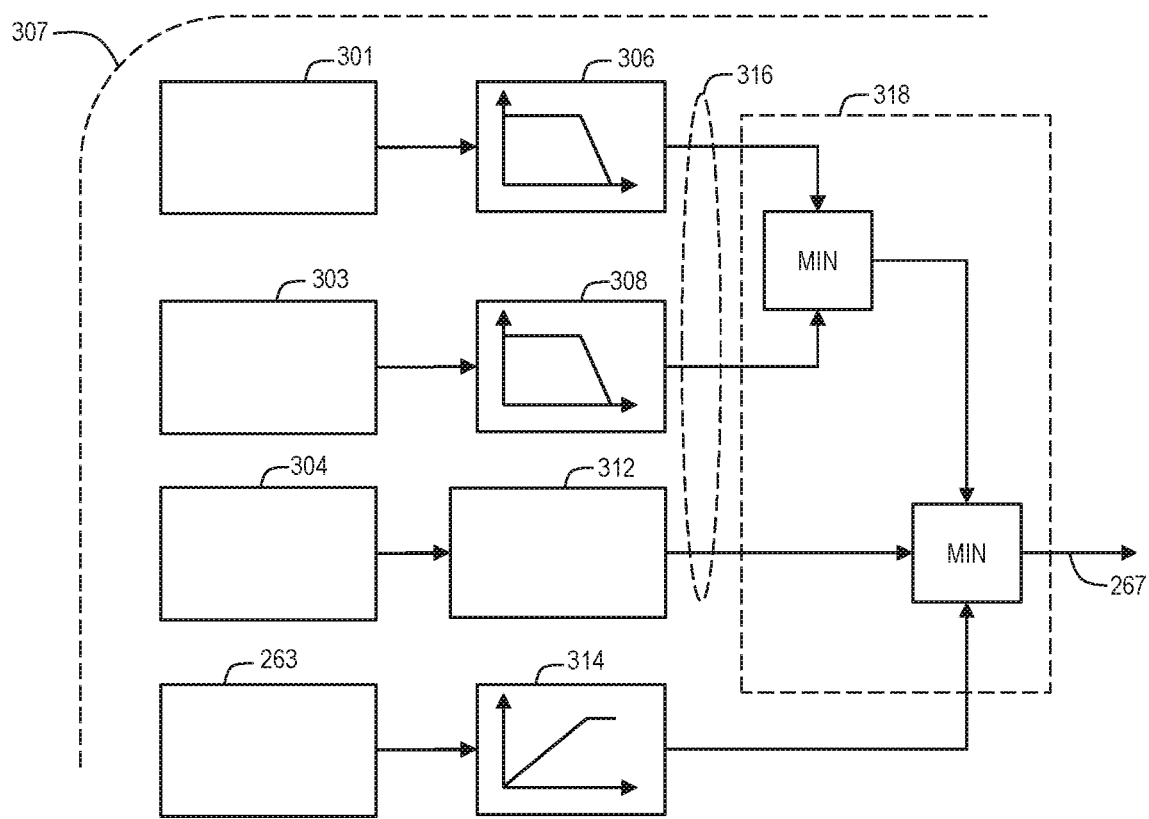
Figure 3C:
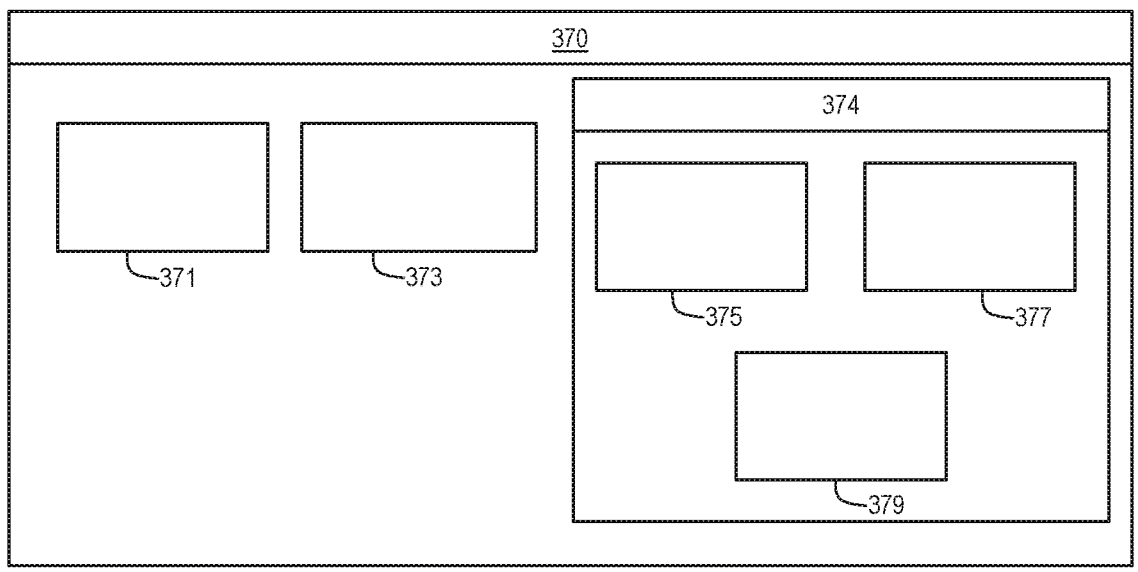

FIGS. 3A, 3B and 3C illustrate exemplary embodiments of the mode management module 261 and command generation module 240 illustrated in FIG. 2. With reference to FIG. 3A, the mode management module 261 may receive heat level request 263 as previously described, for example from vehicle controller 103 in FIG. 1. Command generation module 240 may receive torque command signals (Tcmd) 236, angular rotation angular velocity ($\omega_e$) 238 of the shaft of the AC motor 120, and the DC input voltage (Vdc) 239.

In the exemplary embodiment of the mode management module 261 of FIG. 3A, additional EDU 102 temperature inputs 305 including from temperature sensors 301 and temperature estimators 303 may be obtained. Such temperature inputs may provide temperature information relative to EDU 102 electrical and mechanical components such as active inverter components (e.g., IGBTs, diodes, junction devices), passive inverter components (e.g., capacitors), current conductors and bus bars, motor rotor, stator and shaft, and housing and enclosure, for example. The temperature inputs 305 and heat level request 263 are used by a current determination module 307 to determine a maximum current magnitude (Iss-heat) 267 that is allowed considering various temperature and current inputs. For example, a general case of higher temperatures of any given active inverter component may indicate a lower maximum current. The mode control module 309, based upon the heat level request 263, the maximum current magnitude (Iss-heat) 267 and other system inputs 311, for example vehicle controller 103 requests or EDU 102 parameters, provides the mode control signal 265 output from the mode management module 261 which, in the present embodiment, may include the maximum current magnitude (Iss-heat) and other mode information as described herein.

With reference to FIG. 3B, one embodiment of determining maximum allowable current magnitude (Iss-heat) by the current determination module 307 is illustrated. Information from the temperature sensors 301 and the temperature estimators 303 may be evaluated against respective temperature limit calibrations 306 and 308. For example, the temperature limit calibrations 306 and 308 may relate current limits to the temperature information in simple look-up tables. Stator current information 304, for example the synchronous reference frame feedback current signals (Idq) 232, may be evaluated against a current-time profile 312, it being generally understood that lower currents may be acceptable for longer periods of time whereas larger currents may be acceptable for shorter periods of time. The heat level request 263 from the vehicle controller 103 may be evaluated by a current determination module 314 which maps the heat level request 263 to a desired maximum current. Such mapping may be by way of any appropriate means including calculated output values based on a predefined linear or non-linear function or through a look-up table for example. The various evaluations 306-312 may produce a plurality of respective current limits 316 which may be subjected to an arbitration process 318 including, for example, selection of the minimum returned one of the plurality of respective current limits 316 and desired maximum current in order to settle upon the maximum current magnitude (Iss-max) 267. Unless one of the current limits from evaluations 306-312 is less than the desired maximum current from the current determination module 314 based on the heat level request 263, the maximum allowable current magnitude (Iss-heat) 267 will correspond to the desired maximum current from the current determination module 314.

With reference to FIG. 3C, exemplary modes of operation 370 including heat generating modes 374 for invocation by the mode control module 309 of mode management module 261 in the motor controller 105 are illustrated. Mode control module 309 (FIG. 3A) may receive the heat level request 263 from the vehicle controller 103, the maximum current magnitude (Iss-heat) 267 and other system inputs 311. The modes shown in FIG. 3C are by way of non-limiting example and other operating modes may be apparent to those skilled in the art, including system invoked modes as well as operator invoked modes, for example via settings and preferences. Modes may be implemented by priority or default. For example, where a specific mode is not system or user invoked, an optimal efficiency mode 371 may be employed. A system or user request for a mode may be implemented in accordance with system requirements, priorities and opportunities. For example, an optimal noise, vibration and harshness (NVH) mode 373 may be requested by a user during extended periods of slow, crawling traffic to improve ride experience. Alternatively, an optimal NVH mode may be system invoked during aggressive acceleration events. However, a system request for a maximum heat generation mode 375 may override an operator or system request for the NVH mode 373 when rapid heat generation is desirable, for example for cabin heating or raising the temperature of the RESS 104 after a cold soak period. Moreover, the modes of operation may not be mutually exclusive and objectives of multiple modes may be attained, for example by defining modes which achieve more than one objective, for example a NVH and heat generation mode 379. An exemplary operation in an NVH and heat generation mode 379 is discussed in further detail below. A thermal mode 377 may provide heat generation less than the maximum heat generation mode and may be variable in accordance with an operator or system request, for example to maintain a target cabin temperature or to maintain RESS 104 temperature to a predetermined operating target.

In the exemplary embodiment of the command generation module 240 of FIG. 3A, torque command signal (Tcmd) 236, angular velocity ($\omega_e$) 238 of the shaft of the AC motor 120, and the DC input voltage (Vdc) 239 are used in a current trajectory configuration module 333 to determine a plurality of candidate current trajectories 315 (e.g., Idq-1 . . . Idq-n) as described further herein. As used herein, current trajectories are understood to include current operating points along the trajectory and corresponding current commands for use by the FOC controller 200. Reference to a current trajectory may include a current command to a current operating point, for example in a regularly executed control loop of the FOC controller 200. In one embodiment, the plurality of candidate current trajectories 315 may be determined through calibration look-up tables. Multiple libraries of tables may be used and particular libraries selected based upon mode information as described further herein. Selection of one of the plurality of candidate current trajectories 315 for use in establishing the synchronous reference frame current trajectories (Idq-cmd) 242 in the FOC 200 for achieving the torque and heat objectives may be made in accordance with an arbitration module 331 in response to the mode control signal 265 from the mode control module 309 of mode management module 261. The mode control signal may include the maximum current magnitude (Iss-heat) and mode selection information determined in accordance with system and user requests, settings and preferences as discussed herein.

Figure 5A:
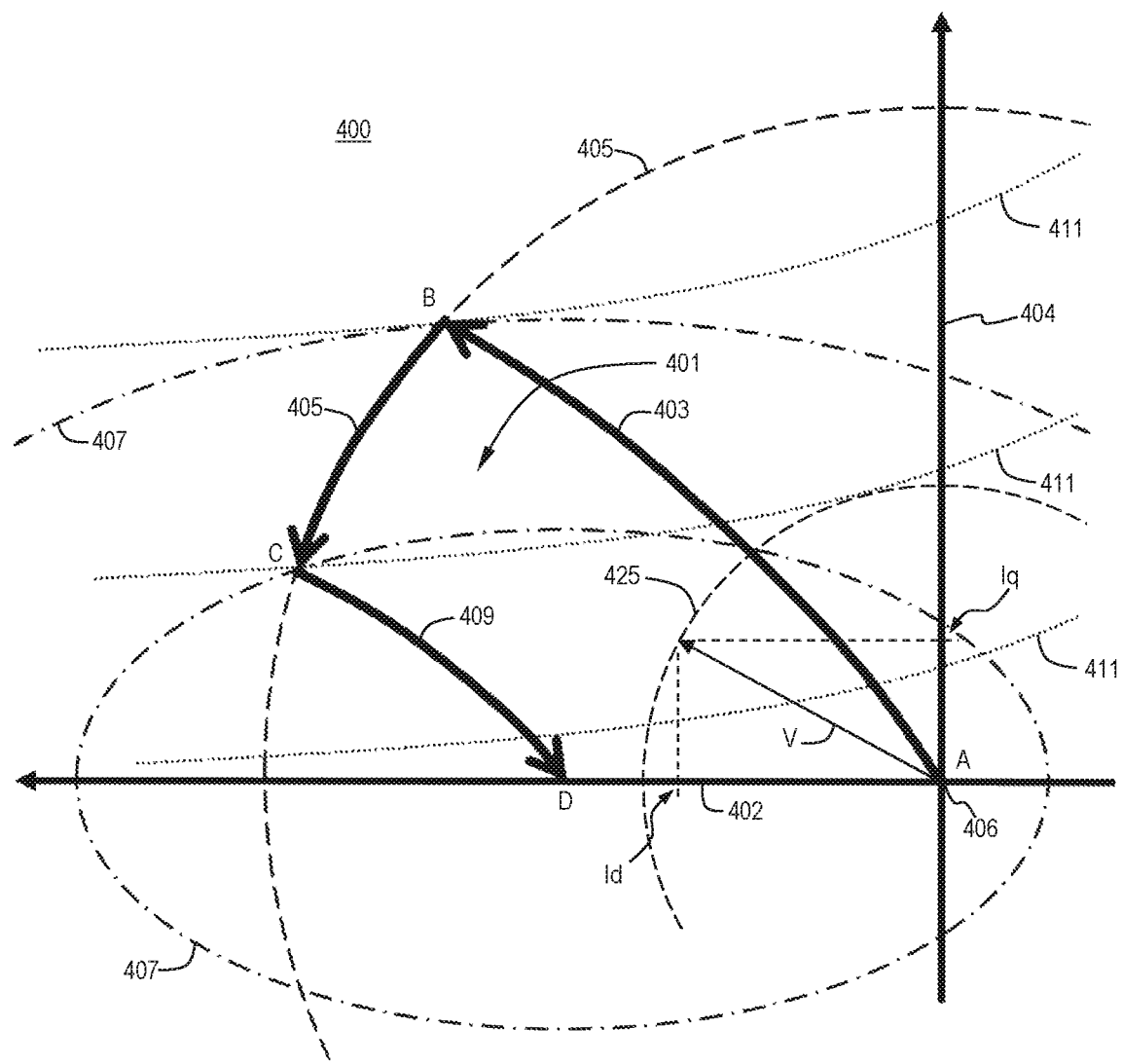
FIGS. 5A and 5B illustrate an operating quadrant of an exemplary dq reference frame for motor currents, in accordance with the present disclosure.
Figure 5B:
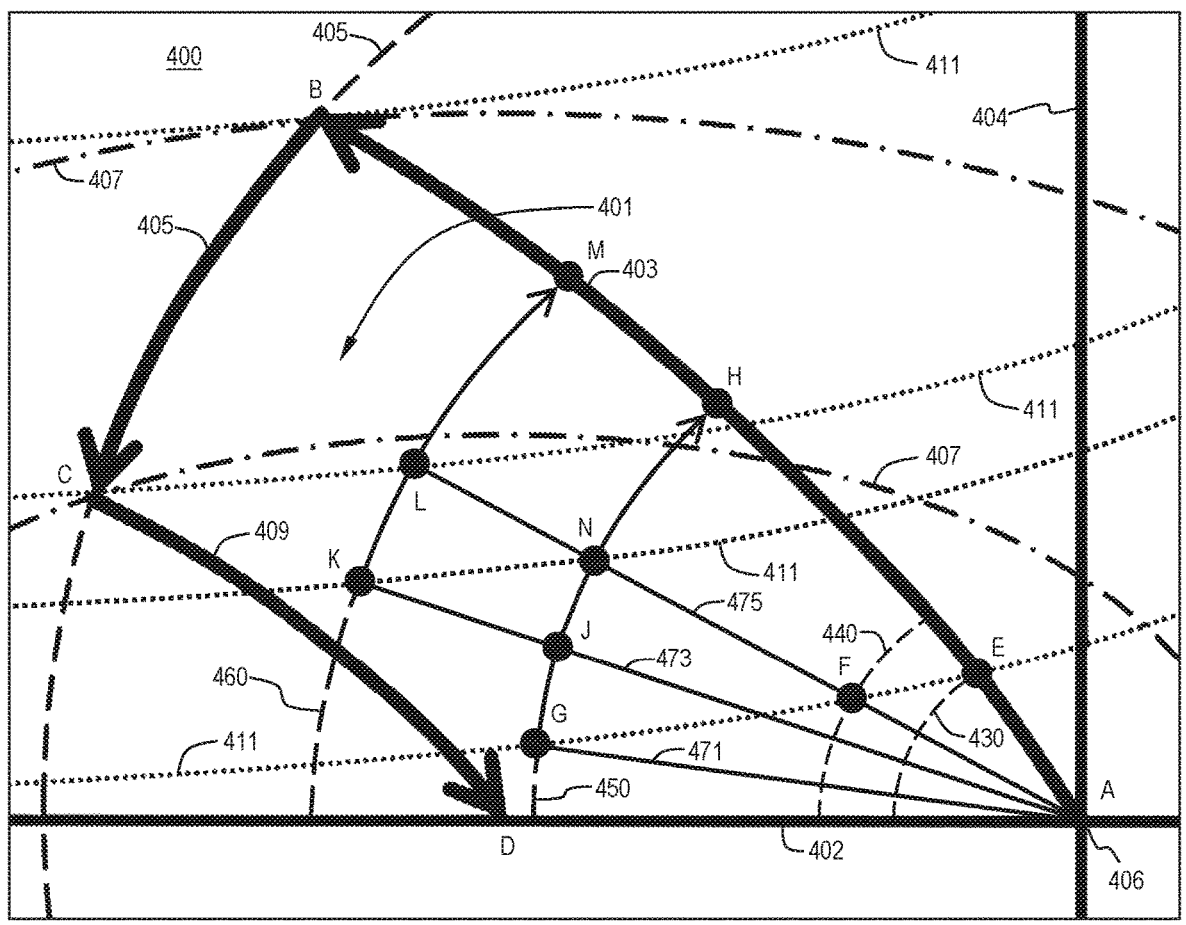

FIGS. 5A and 5B illustrate an operating quadrant of an exemplary dq reference frame 400 for motor currents defined by the horizontal d-axis 402 and vertical q-axis 404 intersecting at the reference frame origin 406. FIG. 5B provides a larger representation of an operating region 401 in the dq reference frame and includes additional detail regarding exemplary current trajectories discussed further herein. As understood by one having ordinary skill in the art, certain operational boundaries within the dq reference frame 400 are adhered to either as control objectives or control limits. For example, in accordance with one embodiment of the present controls, an operating region 401 may be delimited by a maximum torque per ampere (MTPA) curve (A-B) 403, a current limit circle (B-C) 405, a maximum torque per volt (MTPV) curve (C-D) 409, and the d-axis (D-A) 402. Thus, a general control axiom requires Idq operation within the operating region 401 as set forth. Within the dq reference frame are constant torque curves 411 for the three-phase motor 120. The points on the MTPA curve 403 have the shortest distances from the origin 406 of the dq reference frame 400 to the constant torque curves 411 (i.e., tangential intersection of the constant torque curves 411 and current magnitude circles) and thus the MTPA curve 403 represents the most efficient torque operation (i.e., minimum current for torque production). The points on the current limit circle (B-C) 405 and the MTPV curve (C-D) 409 are within the flux weaking region. Operation on the current limit circle (B-C) 405 is also at the shrinking voltage limit ellipses 407 (size inversely proportional to motor speed) (i.e., at the intersection of the current limit circle 405 and the voltage limit ellipse 407). The points on the MTPV curve (C-D) 409 correspond to tangential intersection of the constant torque curves 411 and voltage limit ellipses 407 and thus the MTPV curve 403 represents maximum torque under the inverter voltage limitation. Thus, flux weakening operation on the current limit circle (B-C) 405 is both current and voltage limited, whereas flux weakening operation on the MTPV curve (C-D) 409 is voltage limited. Operation within the operating region 401 bounded by the MTPA curve (A-B) 403, the current limit circle (B-C) 405 and the MTPV curve (C-D) 409 may be voltage limited above certain speeds (e.g., the motor base speed), but below which speeds the region is neither voltage nor current limited. An exemplary current vector V has a magnitude corresponding to its length which corresponds to a current circle 425 whose center is at the reference frame origin 406. The vector V also has a phase angle ($\beta$) from the q-axis 404. Current vectors within the dq reference frame 400 are resolvable into their d-axis current component (Id) and q-axis current component (Iq).

With more particular reference to FIG. 5B, points E, F and G illustrate three points of equivalent torque. Point E is on the MTPA curve 403 and corresponds to a current vector within the dq reference frame 400 having a magnitude corresponding to the current circle 430. Point F is off the MTPA curve 403 but produces the same torque as point E, however at a greater current magnitude corresponding to the current circle 440. Finally, point G is also off the MTPA curve 403 but produces the same torque as points E and F, however at an even greater current magnitude corresponding to the current circle 450 which is greater than current circles 430 and 440. Thus, it is appreciated that current vectors producing equivalent torque at differing points along an equivalent torque curve may have different current magnitudes, with the greater magnitude current vectors having phase angles locating them closer to the d-axis 402. All else being equal, the greater the current magnitude, the more heat is produced in the EDU 102.

In one embodiment, a plurality of heat generating current trajectories within the operating region 401 may be available for effecting torque levels and generating heat. For illustration, two such trajectories 473 and 475 may be capable of achieving an equivalent torque level K and N along a line of constant torque 411 within the operating region 401. If the maximum current magnitude (Iss-heat) 267 is at least equal to the current circle 460 intersecting point K, then either current trajectory 473 or 475 can achieve the torque level and both may be considered a candidate trajectory. However, if the maximum current magnitude (Iss-heat) 267 is more limited than the current circle 460, then so long as the maximum current magnitude (Iss-heat) 267 is at least equivalent to the current circle 450, trajectory 475 remains a candidate trajectory. Selection from among candidate trajectories may be made in accordance with the mode control signal 265 which may further include information regarding a desired rate or aggressiveness of heat generation. More aggressive heating may result in selection of current trajectories which lie closer to the d-axis 402. Assuming that current circle 460 corresponds to the maximum current magnitude (Iss-heat) 267, torque targets intersecting each trajectory 473 and 475 may be achieved up to those corresponding to the maximum current magnitude (Iss-heat) 267 (i.e., K and L respectively). Once the controlled current reaches the maximum current magnitude (Iss-heat) 267, further torque increases require an alternative trajectory. In one embodiment, an adjacent candidate trajectory may be selected in accordance with an alternative phase angle. For example, where current trajectory 473 is being followed and the current reaches point K, adjacent trajectory 475 may be employed whereby and equivalent torque at point N may be achieve along current trajectory 475 at a reduced current magnitude. Such control requires a step change (i.e., relatively large changes over limited control cycles) in both current magnitude and phase angle. Current magnitude may then increase from point N along the trajectory 475 to achieve higher torques until the maximum current magnitude (Iss-heat) 267 may once again be reached at point L. In another embodiment, further torque increases may be achieved through a current trajectory of constant current (i.e., Iss-heat). Such control requires no changes in current magnitude and only incremental phase angle changes over each control cycle. A constant current trajectory (e.g., K-L-M) may benefit the objective of a more rapid and aggressive heat generation by the EDU 102 by maintaining a larger current magnitude. As well, a constant current trajectory effectively smoothly walks the current operating point along the current circle 460 at the maximum current magnitude until the operating point M on the MTPA curve (A-B) 403 is reached whereafter current trajectory control may be in accordance with a trajectory following the MTPA curve (A-B) 403. Constant current trajectories are also beneficial as torque continues to increase because increasing torque operating points progress smoothly toward the MTPA trajectory (e.g., K-L-M) whereat smooth transition into the MTPA trajectory may be accomplished thus reducing the opportunity for undesirable torque disturbances which may result from step changes in current magnitude and phase angle.

In one embodiment, a current trajectory may be defined linearly as points along a line up to and including a maximum current. Thus, a trajectory may be a vector defined by a maximum current magnitude, such as the value Iss-heat 267 and an arbitrary phase angle (β). In another embodiment, a current trajectory may be defined curvilinearly, for example as an arc of points along a current circle as discussed herein. Such a current circle may also correspond to the value Iss-heat 267. In another embodiment, a current trajectory may be defined as a combination of linearly and curvilinearly defined portions, for example a vector and an arc. In one embodiment, a current trajectory may include a vector and an arc between the head or terminal end of the vector and the MTPA trajectory including an intersecting operating point, an example of which may be understood as the current trajectory A-N-H in FIG. 5B where point H is an intersecting operating point.

In another embodiment, for example where heat generation and NVH objectives are desired, certain sub-regions within the operating region 401 may be avoided. For example only, current control may be in accordance with the trajectory 473 up through point J whereafter a constant current trajectory from point J to point N is followed by the trajectory 475 from point N to point L thereby avoiding the operating sub-region circumscribed by points L-K-L-N. Such selective operation may be beneficial where, for example, a particular sub-region is undesirable, for example because of known NVH issues associated with that sub-region.

Figure 4:
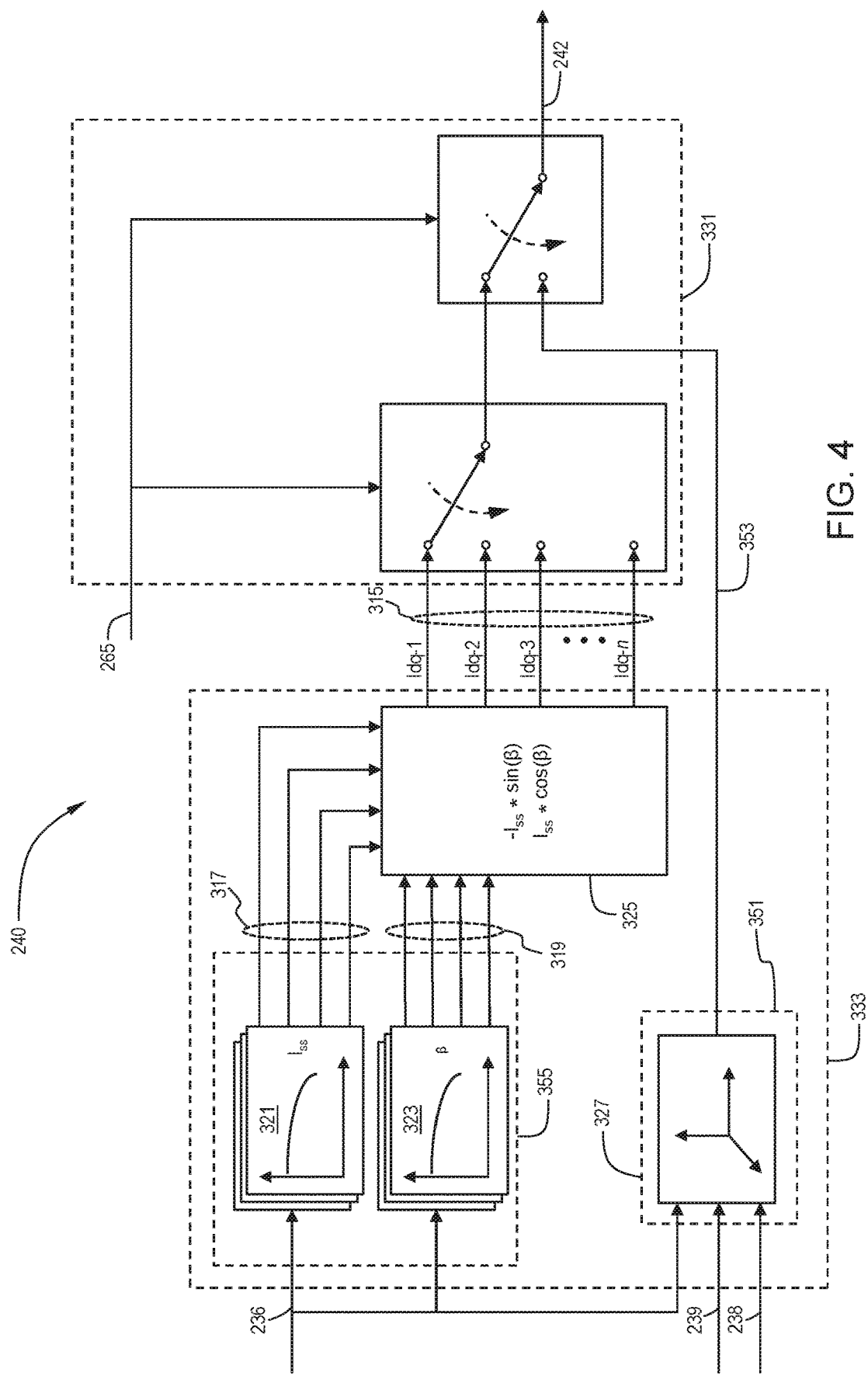
FIG. 4 illustrates an exemplary embodiment of the command generation module illustrated in FIG. 3A, in accordance with the present disclosure.

In accordance with one embodiment, and with further reference to FIG. 4, a command generation module 240 may include a trajectory configuration module 333 and an arbitration module 331. Torque command signals (Tcmd) 236, angular velocity ($\omega_e$) 238 of the shaft of the AC motor 120, and the DC input voltage (Vdc) 239 are provided to the current trajectory configuration module 333. In accordance with one embodiment, a first library 351 may be referenced using the torque command signals (Tcmd) 236, angular velocity ($\omega_e$) 238 of the shaft of the AC motor 120, and the DC input voltage (Vdc) 239 to return a current trajectory 353. Library 351 includes one or more tables including current trajectories corresponding to the MTPA curve (A-B) 403, the current limit circle (B-C) 405 and the MTPV curve (C-D) 409. Library 351 essentially provides current trajectories for use in optimal efficiency modes (e.g., mode 371) not particularly targeting a heat production or other control objectives (e.g., NVH) by the EDU 102. A second library 355 may be referenced using the torque command signals (Tcmd) 236 to return a plurality of current vectors defining a plurality of candidate current trajectories. A first set of tables 321 returns current magnitudes 317 and a second set of tables 323 returns corresponding phase angles 319. The pairs of current magnitudes 317 and phase angles 319 define current vectors which are provided to resolver 325 to return a plurality of candidate current trajectories 315 (e.g., Idq-1 . . . Idq-n). All candidate current trajectories 315 (e.g., Idq-1 . . . Idq-n) and the respective trajectory torques capable to meet the torque command signals (Tcmd) 236 but at varying net heat production (and NVH impact) within the EDU 102 through selective placement within the operating region 401. Library 355 essentially provides current trajectories of varying aggressiveness or rates of heating for use in heat generation within the EDU 102. The mode control signal 265 may determine, through arbitration module 331, whether the current commands 353 from the first library 351 providing a current trajectory for use in optimal efficiency modes or one of the plurality of candidate current trajectories 315 derived from the second library 355 providing current trajectories for use in heating modes. The mode control signal 265 may also determine, through arbitration module 331, which of the candidate current trajectories 315 is to be employed to meet the torque and heat objectives where a heating mode is indicated.

Additionally, or alternatively to heat control by selective employment of current trajectories, as previously described additional heat production within EDU 102 may be effected by increasing gate resistance of gate resistors 112 between the PWM generation module 208 and the IGBTs of the inverter module 110 and/or by increasing the switching frequency of the inverter module 110 and/or by employing more lossy PWM techniques (e.g., continuous PWM such as SVPWM). These additional or alternative techniques may advantageously increase heat generation at the IGBTs or other inverter switching devices yet do not result in any appreciable heat changes to the DC side components (e.g., buses, bars, cables and other current conductors) since these techniques do not depend upon increases in current. Thus, at current limits, for example as determined by current determination module 307, manipulating one or more of gate resistance, switching frequency or PWM technique may increase heat generated within the EDU 102 beyond that achievable through current increasing current trajectories due to current limits.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described.

In other words, the described embodiments are not mutually exclusive, and permutations of one or more embodiments with one another remain within the scope of this disclosure While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for operating an electric drive unit (EDU) including an inverter operatively coupled to a polyphase alternating current (AC) motor and a field oriented controller operating in a dq reference frame operatively coupled to the inverter, comprising:
   receiving a torque command corresponding to a target torque to be produced by the AC motor;
   receiving a heat level request corresponding to a heat to be generated within the electric drive unit;
   providing a first current limit based on temperature of EDU electrical components;
   providing a second current limit based on temperature of EDU mechanical components;
   providing a third current limit based on stator current and a current-time profile;
   providing a fourth current limit based on the heat level request;
   determining a maximum current limit based on a minimum of the first current limit, the second current limit, the third current limit and the fourth current limit;
   providing a plurality of candidate linear current trajectories in the dq reference frame;
   selecting one of the plurality of candidate linear current trajectories at a phase angle corresponding to a desired rate of heat generation;
   when the target torque can be produced at currents along the selected one of the plurality of candidate linear current trajectories without exceeding the maximum current limit, commanding the field oriented controller along the selected one of the plurality of candidate linear current trajectories at the phase angle corresponding to the desired rate of heat generation; and
   when the target torque cannot be produced at currents along the selected one of the plurality of candidate linear current trajectories without exceeding the maximum current limit, commanding the field oriented controller at a phase angle less than the phase angle corresponding to the desired rate of heat generation.

2. The method of claim 1, wherein the plurality of candidate linear trajectories are determined based upon the torque command.

3. The method of claim 2, wherein the plurality of candidate linear current trajectories are determined by referencing pairs of current magnitudes and phase angles defining current vectors, and resolving the current vectors into respective direct-axis current components and quadrature-axis current components.

4. The method of claim 1, wherein commanding the field oriented controller at a phase angle less than the phase angle corresponding to the desired rate of heat generation comprises commanding the field oriented controller along an arc of a current circle at the maximum current limit.

5. The method of claim 1, wherein commanding the field oriented controller at the phase angle less than the phase angle corresponding to the desired rate of heat generation comprises commanding the field oriented controller along an alternative one of the plurality of candidate linear current trajectories at the phase angle less than the phase angle corresponding to the desired rate of heat generation.

6. An apparatus for generating heat in a vehicle, comprising:
   an electric drive unit (EDU) comprising a polyphase alternating current (AC) motor and an inverter operatively coupled to the AC motor; and
   a motor controller operatively coupled to the inverter and configured to:
   control the inverter in accordance with an implemented current trajectory using a field oriented control scheme operating in a dq reference frame;
   receive a torque command corresponding to a desired torque to be produced by the AC motor;
   receive a heat level request corresponding to a heat to be generated within the electric drive unit;
   provide a first current limit based on temperature of EDU electrical components;
   provide a second current limit based on temperature of EDU mechanical components;
   provide a third current limit based on stator current and a current-time profile;
   provide a fourth current limit based on the heat level request;
   determine a maximum current limit based on a minimum of the first current limit, the second current limit, the third current limit and the fourth current limit;
   provide a plurality of candidate linear current trajectories in the dq reference frame;
   receive a mode control signal including the maximum current limit;
   select one of the plurality of candidate linear current trajectories as the implemented current trajectory at a phase angle corresponding to a desired rate of heat generation;
   when the desired torque can be produced at currents along the selected one of the plurality of candidate linear current trajectories without exceeding the maximum current limit, command the field oriented controller along the selected one of the plurality of candidate linear current trajectories at the phase angle corresponding to the desired rate of heat generation; and
   when the target torque cannot be produced at currents along the selected one of the plurality of candidate linear current trajectories without exceeding the maximum current limit, command the field oriented controller at a phase angle less than the phase angle corresponding to the desired rate of heat generation.

7. The apparatus of claim 6, further comprising selectively variable gate resistance operatively coupled between the motor controller and power switches of the inverter, and the motor controller further configured to increase the gate resistance effective to generate additional heat at power switching devices within the inverter.

8. The apparatus of claim 6, wherein the motor controller is further configured to control the inverter in a continuous pulse width modulation effective to generate additional heat at power switching devices within the inverter.

9. The apparatus of claim 6, wherein the motor controller is further configured to control the inverter by increasing a switching frequency effective to generate additional heat at power switching devices within the inverter.

10. The method of claim 6, wherein command the field oriented controller at the phase angle less than the phase angle corresponding to the desired rate of heat generation comprises commanding the field oriented controller along an alternative one of the plurality of candidate linear current trajectories at the phase angle less than the phase angle corresponding to the desired rate of heat generation.

11. The method of claim 6, wherein command the field oriented controller at a phase angle less than the phase angle corresponding to the desired rate of heat generation comprises command the field oriented controller along an arc of a current circle at the maximum current limit.

12. The method of claim 6, wherein the plurality of candidate linear trajectories are determined based upon the torque command.

13. The method of claim 12, wherein the plurality of candidate linear current trajectories are determined by referencing pairs of current magnitudes and phase angles defining current vectors, and resolving the current vectors into respective direct-axis current components and quadrature-axis current components.

14. A method for operating an electric drive unit (EDU) including an inverter operatively coupled to a polyphase alternating current (AC) motor and a field oriented controller operating in a dq reference frame operatively coupled to the inverter, comprising:
   receiving a heat level request corresponding to a heat to be generated within the electric drive unit;
   providing a first current limit based on temperature of EDU electrical components;
   providing a second current limit based on temperature of EDU mechanical components;
   providing a third current limit based on stator current and a current-time profile;
   providing a fourth current limit based on the heat level request;
   determining a maximum current limit based on a minimum of the first current limit, the second current limit, the third current limit and the fourth current limit;
   providing a plurality of candidate linear current trajectories in the dq reference frame;
   selecting one of the plurality of candidate linear current trajectories at a phase angle corresponding to a desired rate of heat generation;
   when a target torque can be produced at currents along the selected one of the plurality of candidate linear current trajectories without exceeding the maximum current limit, controlling the inverter to the one of the candidate linear current trajectories at the phase angle corresponding to the desired rate of heat generation using a field oriented control scheme operating in the dq reference frame;
   when the target torque cannot be produced at currents along the selected one of the plurality of candidate linear current trajectories without exceeding the maximum current limit, controlling the inverter along an arc of a current circle at the maximum current limit intersecting a maximum torque per ampere trajectory at an intersection operating point; and
   transitioning control of the inverter from the arc of a current circle at the maximum current limit to the maximum torque per ampere trajectory at the intersection operating point.

* * * * *